US012258215B2

(12) United States Patent
 van Schijndel et al.

(10) Patent No.: US 12,258,215 B2
(45) Date of Patent: Mar. 25, 2025

(54) STACK ASSIST SYSTEM

(71) Applicant: SAT Technologies USA Holdings, Inc., Grand Rapids, MI (US)

(72) Inventors: Marcel van Schijndel, Groenlo (NL); Garrett Smith, Groenlo (NL); Robin J. Scott, Ada, MI (US)

(73) Assignee: SAT Technologies USA Holdings, Inc., Grand Rapids, MI (US)

( * ) Notice: Subject to any disclaimer, the term of this patent is extended or adjusted under 35 U.S.C. 154(b) by 992 days.

(21) Appl. No.: 17/186,130

(22) Filed: Feb. 26, 2021

(65) Prior Publication Data

US 2021/0276807 A1 Sep. 9, 2021

Related U.S. Application Data

(60) Provisional application No. 62/985,480, filed on Mar. 5, 2020.

(51) Int. Cl.

| | |
|---|---|
| *B65G 1/137* | (2006.01) |
| *B65G 57/22* | (2006.01) |
| *B66F 9/06* | (2006.01) |
| *G05B 13/02* | (2006.01) |
| *G05D 1/00* | (2024.01) |
| *G06T 7/00* | (2017.01) |
| *H04N 7/18* | (2006.01) |

(52) U.S. Cl.
CPC ......... *B65G 1/1375* (2013.01); *B65G 1/1371* (2013.01); *B65G 57/22* (2013.01);
(Continued)

(58) Field of Classification Search
CPC .... B65G 1/1375; B65G 1/1371; B65G 57/22; B65G 2209/04; B65G 57/00; B65G 47/90;
(Continued)

(56) References Cited

U.S. PATENT DOCUMENTS 9,714,145 B1 * 7/2017 Lehmann ............... B65G 57/03
2008/0167817 A1 * 7/2008 Hessler ................ G01C 21/005
701/514

(Continued)

FOREIGN PATENT DOCUMENTS

BR 102014023102 A2 * 5/2016
CA 3131592 A1 * 3/2022 ........... B62B 3/0612
(Continued)

OTHER PUBLICATIONS

PCT International Search Report & Written Opinion dated May 4, 2021, Application No. PCT/US2021/019778.
(Continued)

*Primary Examiner* — Jacob S. Scott
*Assistant Examiner* — Erin Morris
(74) *Attorney, Agent, or Firm* — The Dobrusin Law Firm, PC (57) ABSTRACT

A stack assist system includes a stacking surface, such as a pallet, configured to receive a plurality of packages thereon. A graphical display is configured to display a visual representation of an optimized stack of packages on the staking surface. A package position indicator may indicate the location of a package to be placed on package stack. The system may receive package data from a warehouse management system and determine an optimized stack based on numerous considered and weighted parameters related to the packages. The stack assist system may further optionally include a mobile unit to travel through a warehouse, over an optimized path, to retrieve packages intended for a stack.

18 Claims, 8 Drawing Sheets

(52) U.S. Cl.
CPC ............ B66F 9/063 (2013.01); G05B 13/024 (2013.01); G05D 1/0212 (2013.01); G06T 7/0006 (2013.01); H04N 7/18 (2013.01)

(58) Field of Classification Search
CPC ......... B65G 57/24; B65G 61/00; B66F 9/063; G05B 13/024; G05D 1/0212; G06T 7/0006; H04N 7/18; H04N 7/183
See application file for complete search history.

(56) References Cited

U.S. PATENT DOCUMENTS

| | | | | |
|---|---|---|---|---|
| 2010/0089703 | A1* | 4/2010 | Gallagher | B62D 51/04 |
| | | | | 187/231 |
| 2010/0222915 | A1* | 9/2010 | Kuehnemann | G06Q 10/08 |
| | | | | 706/14 |
| 2013/0015675 | A1 | 1/2013 | Pickard et al. | |
| 2019/0080283 | A1 | 3/2019 | Millhouse | |
| 2019/0193956 | A1 | 6/2019 | Morland | |
| 2021/0139256 | A1* | 5/2021 | Fu | G05B 19/4189 |
| 2021/0141368 | A1* | 5/2021 | Holwell | G05B 19/41895 |

FOREIGN PATENT DOCUMENTS

| | | |
|---|---|---|
| DE | 3814101 A1 * | 11/1988 |
| WO | 2018/170102 A1 | 9/2018 |

OTHER PUBLICATIONS

Extended European Search Report dated Feb. 26, 2024, Application No. 21764764.3.

\* cited by examiner

STACK ASSIST SYSTEM

This application claims priority to U.S. Provisional Patent Application No. 62/985,480 filed on Mar. 5, 2020 and entitled STACK ASSIST SYSTEM, which is hereby incorporated by reference.

FIELD OF INVENTION

The present invention relates to a method and system for determining an arrangement of items on a pallet and providing user instructions to implement the arrangement.

BACKGROUND

Order picking, the process of loading product orders onto shipping pallets, within a warehouse is a time consuming and costly process. Research shows that in a conventional warehouse an average of 50 to 60 percent of all employer costs are attributed to order picking. For this reason, warehouses often attempt to optimize the order picking process.

One optimization solution is known as slotting, where fast-moving order pickers are positioned in the front and slow-moving order pickers. Another solution is to optimize the routes that the order pickers must travel in the warehouse. Experts have developed various algorithms to calculate the shortest route covering all pick locations on a pick list or create multiple location where the same product is located.

In addition, many warehouses save time by combining several orders into one pick route (batch-pick), for example by pick to 2 roll cages or pallets for different customers. Modern technology also lends a helping hand. Voice picking ensures that order pickers can have their hands free which makes multi-tasking possible. As they are verbally confirming the pick assignment they can pick the product and place it on the roll cage or pallet.

However, even with these developments, there are still many deficiencies in the order picking process, specifically related to creating consistency in order picking. One area of inconsistency is between order pickers themselves. Specifically, order pickers may work at varying rates due to their differences, such as different walking paces, different knowledge of the warehouse and product locations, different special awareness, and general differences in experience. All of these differences may lead to inconsistency in productivity between order pickers.

Figure 1:
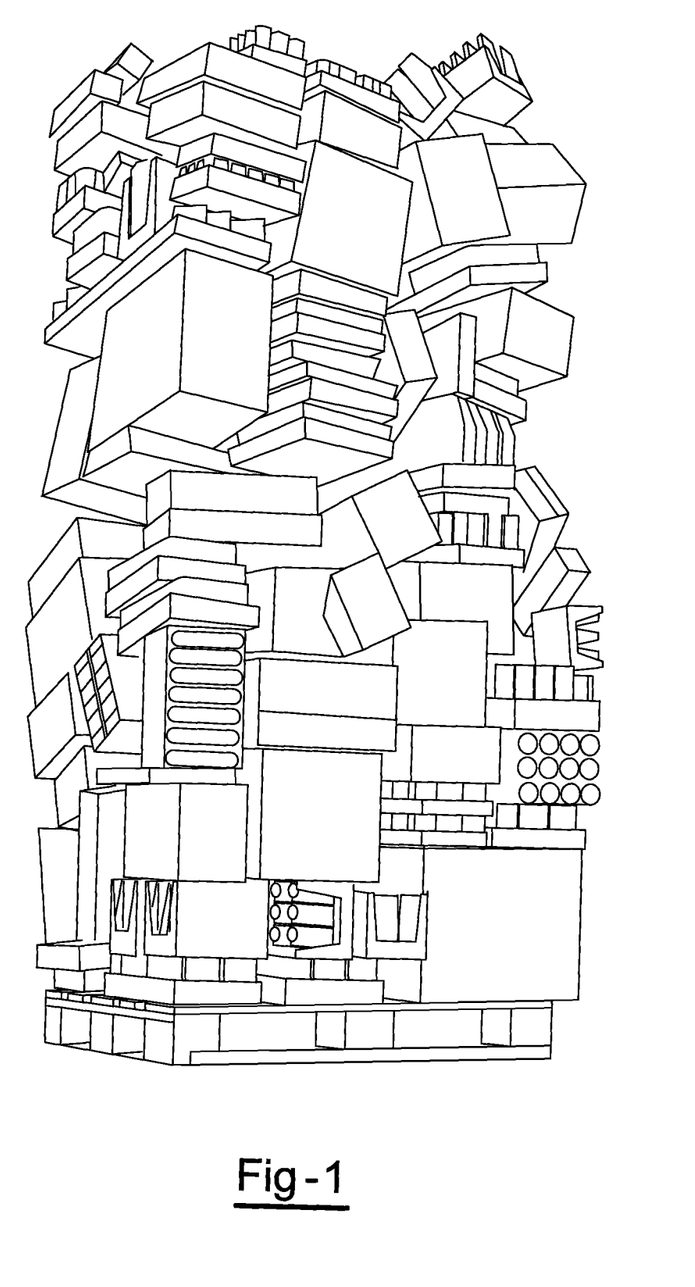
FIG. 1 illustrates an un-optimized pallet stack.

In addition, differences in the spatial awareness and experience of order pickers can lead to the construction of unstable product stacks, such as shown in FIG. 1. Order pickers are charged with arranging a list of products on a pallet to be shipped. However, unstable stacks that have unwanted gaps or products that extend outside of the pallet footprint can lead to various issues in the order picking process. For example, unstable stacks may topple or partially topple causing delays due to restacking. Additionally, unstable stacks may be unable to hold all of the necessary products which may lead to further restacking and delays.

Accordingly, an improved method and device for order picking and stacking is needed.

SUMMARY

A stack assist system is generally presented. The stack assist system may comprise a stacking surface, such as a pallet, configured to receive a plurality of packages thereon. The stack assist system may further include a graphical display configured to display a visual representation of an optimized stack of packages stacked onto the stacking surface. The system may be configured to receive package data related to packages within a warehouse. The package data may include one or more of package location, package destination, package size, package weight, and package dimensions. The stack assist system may determine the optimized stack based on the package data received.

In an embodiment, the optimized stack may include a support member positioned adjacent to the stacking surface. The support member may hold various components including the graphical display. The support member may further support a camera configured to capture image data of the stacking surface. The stack assist system may further include package position indicator, such as a laser, configured to project a visual indication of location to place a package on the stacking surface.

In an embodiment, the stack assist system may generate an optimized stack based on one or more parameters including, but not limited to: the footprint of the stack; weight distribution within the stack; stability of the stack; order of packages to be stacked or unstacked; open air and density of packages within the stack; total height of the stack; and grouping of like or related packages. The parameters considered in generating the optimized stack may be weighted and the weighting of the parameters may be user adjusted to modify the optimization of the stack. The stack assist system may further be connected to or integrated with a warehouse management system to receive package data from the warehouse management system.

In an embodiment, the stack assist system may include a mobile unit. The mobile unit may support the stacking surface and may be configured to travel through a warehouse to retrieve packages. The mobile unit may be a user guided unit or may be an automated vehicle, such as an AGV. The stack assist system may determine an optimal route for the mobile unit to travel through a warehouse to obtain all packages to be placed on an given optimized stack.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A stack assist system 10 is generally presented, as illustrated in FIG. 1 and further depicted in the Figures. The stack assist system may be configured to provide assistance and instructions for manually and optimally stacking products or packages on a pallet 12 or other stacking base. The stack assist system 10 may be implemented within a warehouse or similar facility having products that stored at known locations within the warehouse and to be delivered to a known destination.

The stack assist system 10 may include and/or be configured to integrate and/or communicate with a warehouse management system ("WMS"). The WMS may comprise a software and/or hardware designed to support and optimize warehouse functionality and management. The WMS may generally monitor and store information related to the products and inventory within the warehouse. For example, the WMS may receive and store statistical information about products or packages stored in the warehouse. The stored statistical information may include the size dimensions (including the height, width, and length of each product package), and the weight of each product, the location of each product within the warehouse, identification information (such as barcode, product number, or other identification information), shipping and destination information, material contents of the product packaging, storage restrictions (such as weight, temperature, and time restrictions, and the like), and other related statistical information about the products stored within the warehouse.

The stack assist system 10 may communicate with the WMS and utilize information within the WMS as inputs to determine an optimized stacking pattern for stacking products or packages on a pallet. The pallet may be intended to be placed on a shipping vehicle, such as a truck or the like, and to be sent to one or more locations to drop off the products and/or packages contained on the pallet.

While the stack assist system 10 may communicate with and utilize the WMS as an input and to receive input information into the system 10, it will be appreciated that the system 10 may further access and connect to other databases to access statistical or location information of products within the warehouse, shipping locations, or other information related to products within the warehouse.

Figure 3:
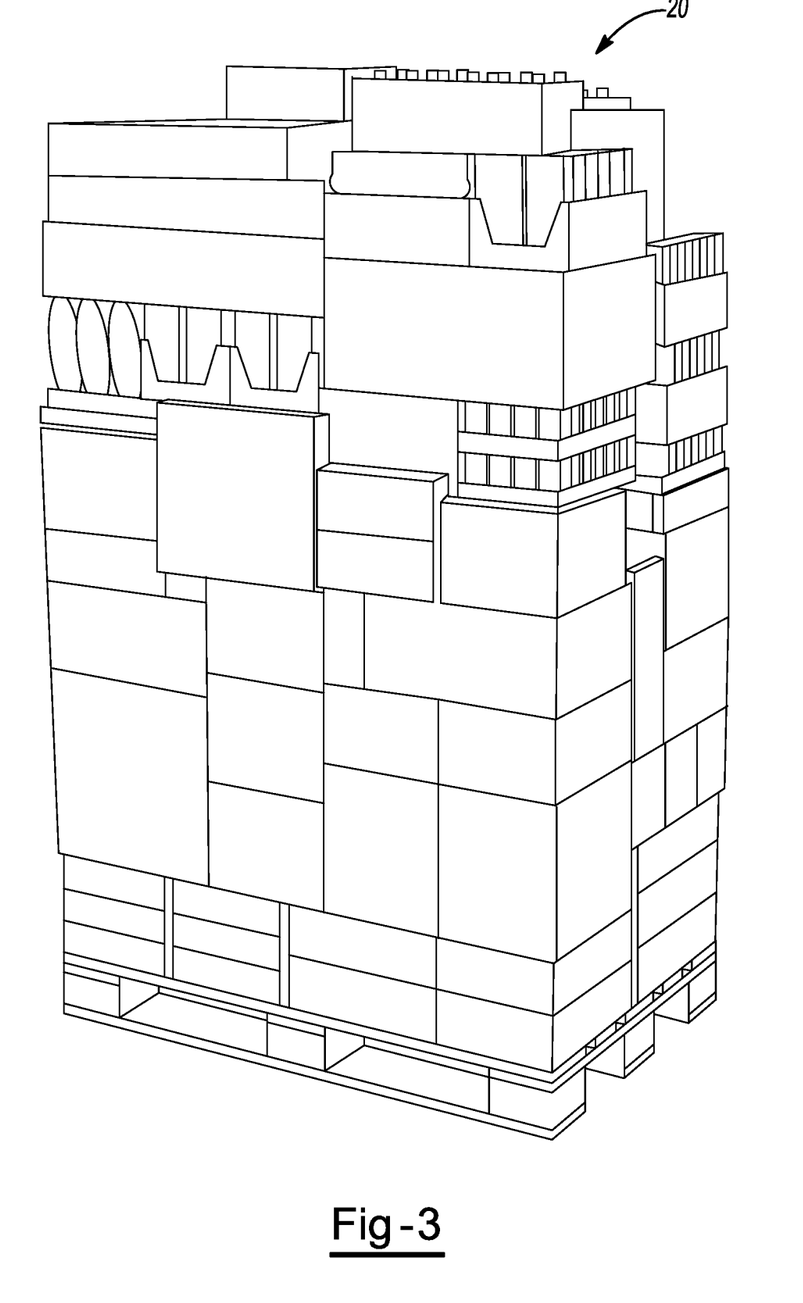
FIG. 3 illustrates an optimized pallet stack.

The stack assist system 10 may be specifically configured to determine an optimized pallet stack 20, as illustrated in FIG. 3. The optimized pallet stack 20 may comprise products from within the warehouse that are stacked on a pallet 12 or base layer. The stack assist system 10 may use all available inputs, including inputs from the WMS, to determine the optimized pallet stack 20. In an embodiment, the stack assist system 10 may utilize at least the size and weight dimensions of the product packaging for products within the warehouse to determine the optimized pallet stack 20.

The stack assist system 10 may seek to meet one or more objectives when determining the optimized pallet stack 20. These objectives may include: utilizing the entire space within the footprint of the pallet 12; reducing overflow or any product or package that extends beyond the footprint of the pallet 12; optimizing weight considerations to prevent crushing any packages by positioning heavier packages below lighter packages; increasing stability to prevent tipping by managing the arrangement of weights, order of stacking, filling of spaces, and geometry within the optimized pallet stack 20; increasing the height of the optimized pallet stack 20 increasing stability; considering family groupings within the optimized pallet stack 20 to keep products that are intended for the same destination or products that may be positioned near one another at an end user's location near to each other on the pallet stack 20; reducing pallet stacking time by ordering the packages on the stack 20 in a sequence that allows for an optimized trip through the warehouse.

In an embodiment, the stack assist system 10 may receive an input from a user to increase the weight given to one or more of the above objections when creating the optimized pallet stack. For example, a user may select that the optimized pallet stack emphasize reduction in pallet stacking time. The stack assist system 10 may then determine an optimized pallet stack 20 that places a greater emphasis on pallet stacking time while reducing emphasis on other optimization objectives.

Figure 2:
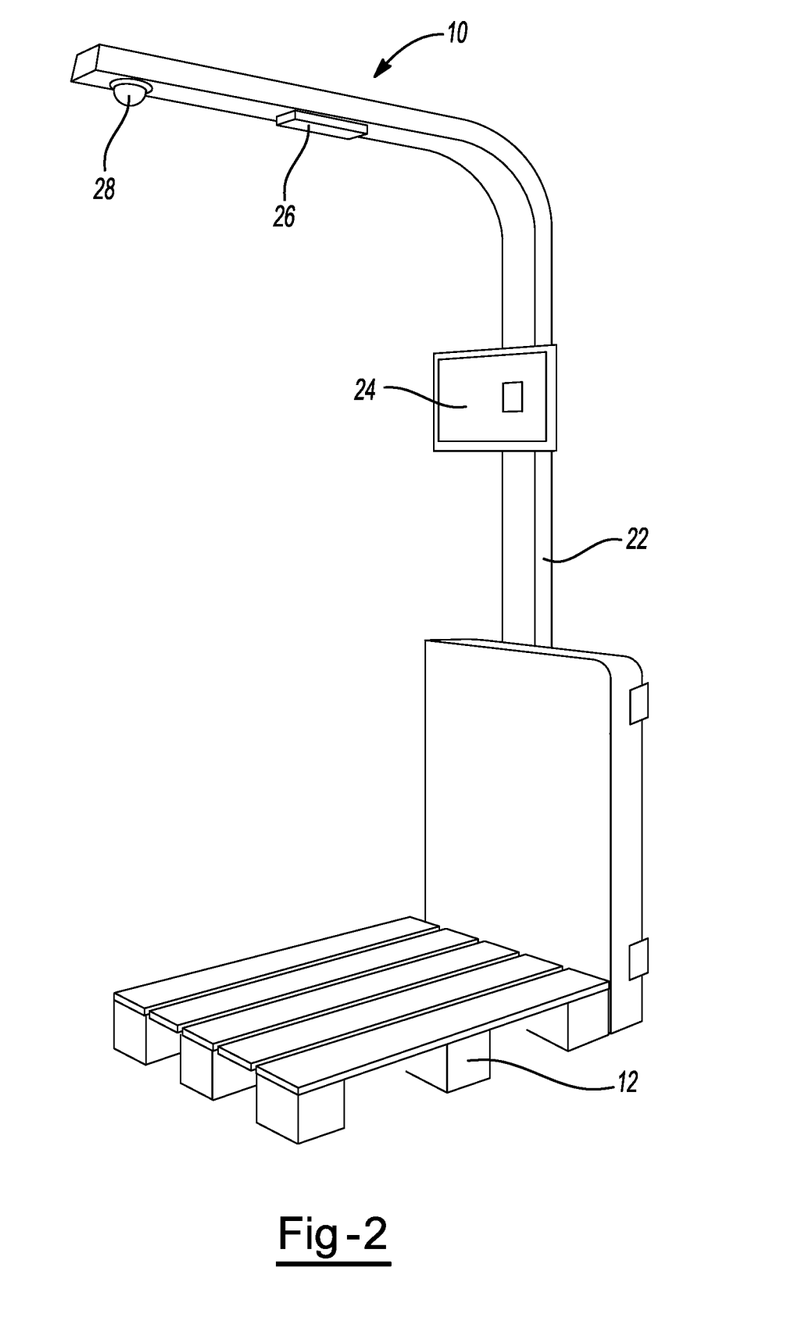
FIG. 2 illustrates a hardware for a stack assist system.

The stack assist system 10 may include a hardware to assist in helping a user implement and create the optimized pallet stack 20. An embodiment of the hardware is illustrated in FIG. 2. The hardware may be configured to be positioned adjacent to a pallet 12 that will support the optimized pallet stack 20. The hardware may provide step by step instructions and feedback to the user, as described below.

The stack assist system 10 hardware may include a support beam 22. The support beam 22 may extend both vertically adjacent to the pallet 12 and horizontally above the pallet 12. The support beam 22 may house various components of stack assist system 10 as illustrated in the FIGS. and described below. The support beam 22 may further house power and communication connections for each of the components.

The stack assist system 10 may include a graphical display 24. The display 24 may comprise a display screen or touch screen. The display 24 may provide a graphical representation of the optimized pallet stack 20. The graphical representation may be provided in varying views, such as a perspective view 32 shown in FIG. 5a or a top view 34 shown in FIG. 5b. The display 24 may provide instructions to the user of where the next package to be placed on the stack 20 should be positioned. For example, the display 24 may show a graphical representation of the current stack and may further display a highlighted or differently colored package at the location where a new package should be placed to provide stacking and placement instructions to a user. The display 24 may additionally be used to communicate other information to users, such as locations of the next item to be stacked or other stacking related information.

Figures 4, 5A, 5B:
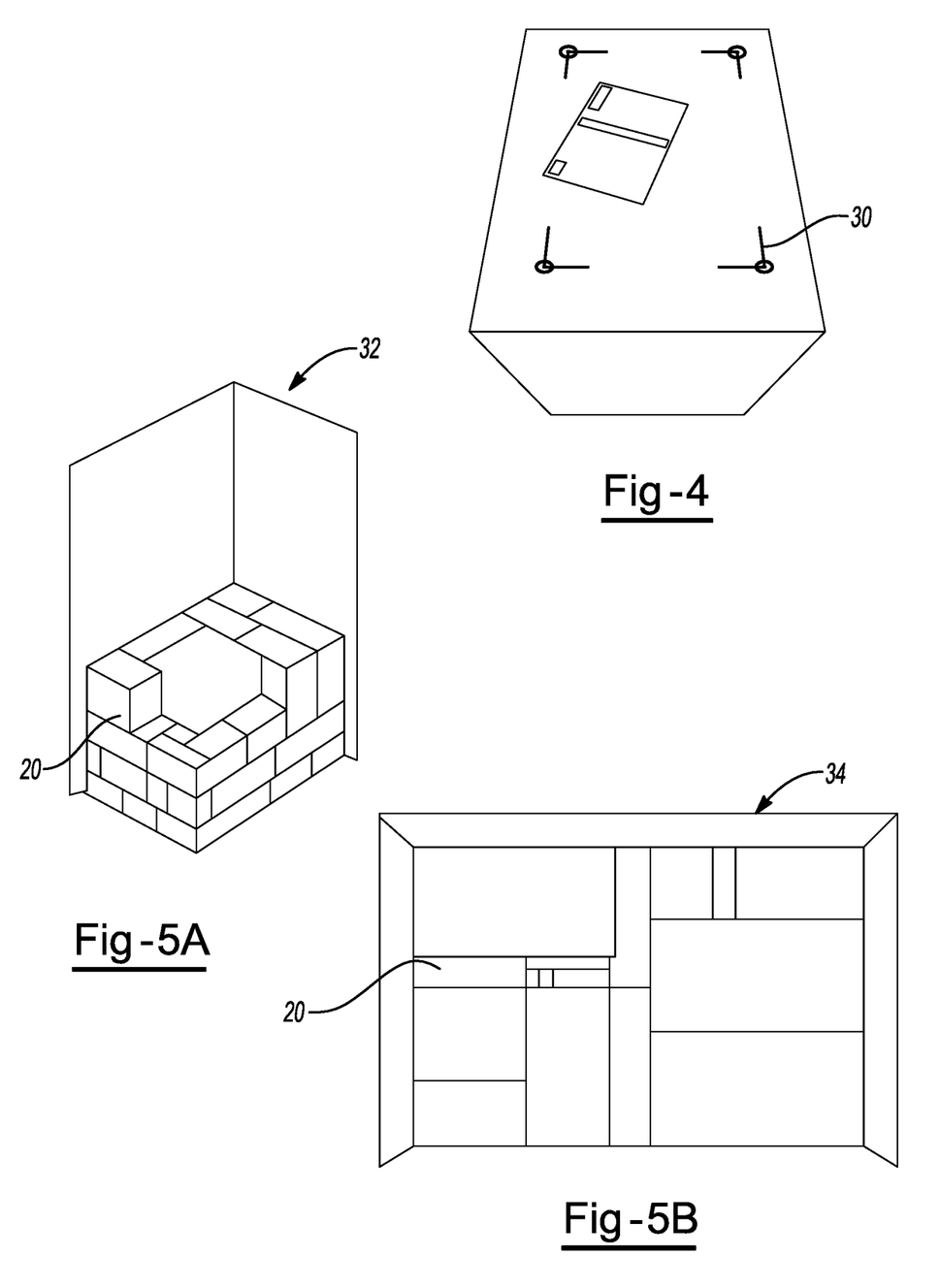
FIG. 4 illustrates a laser projection onto an optimized pallet stack.
FIG. 5a illustrates a perspective view of an optimized pallet stack on a graphic display.
FIG. 5b illustrates a top view of an optimized pallet stack on a graphic display.

The stack assist system 10 may include a laser 26. The laser 26 may be positioned above the optimized pallet stack 20, such as attached to the horizontal portion of the support beam 22. The laser 26 may be configured to provide placement guidance to a user for placing a package on the stack. As shown in FIG. 4, the laser 26 may project an outline of the perimeter for where the next box or package should be placed. The projected perimeter gives guidance to an order picker to provide them with the precise location of the next package.

The stack assist system may further include a camera 28. The camera may be positioned above the optimized pallet stack 20, such as attached to the horizontal portion of the support beam. In an embodiment, the camera 28 may be positioned at an angle with respect to the pallet stack 20 to capture more than one dimension of the stack 20. The camera 28 may capture visual data of the pallet stack 20 to verify the dimensions and placement of packages on the stack by comparing the geometry of the optimized pallet stack 20 with the anticipated geometry. The verification may be used to both verify that the correct package was placed on the pallet stack 20 and to verify correct placement and positioning of the package on the pallet stack 20.

The camera 28 may store images of the products placed on the optimized pallet stack 20. The images may be used for tracking purposes, such as confirming that a package was placed on a stack and verifying order accuracy.

Figure 6:
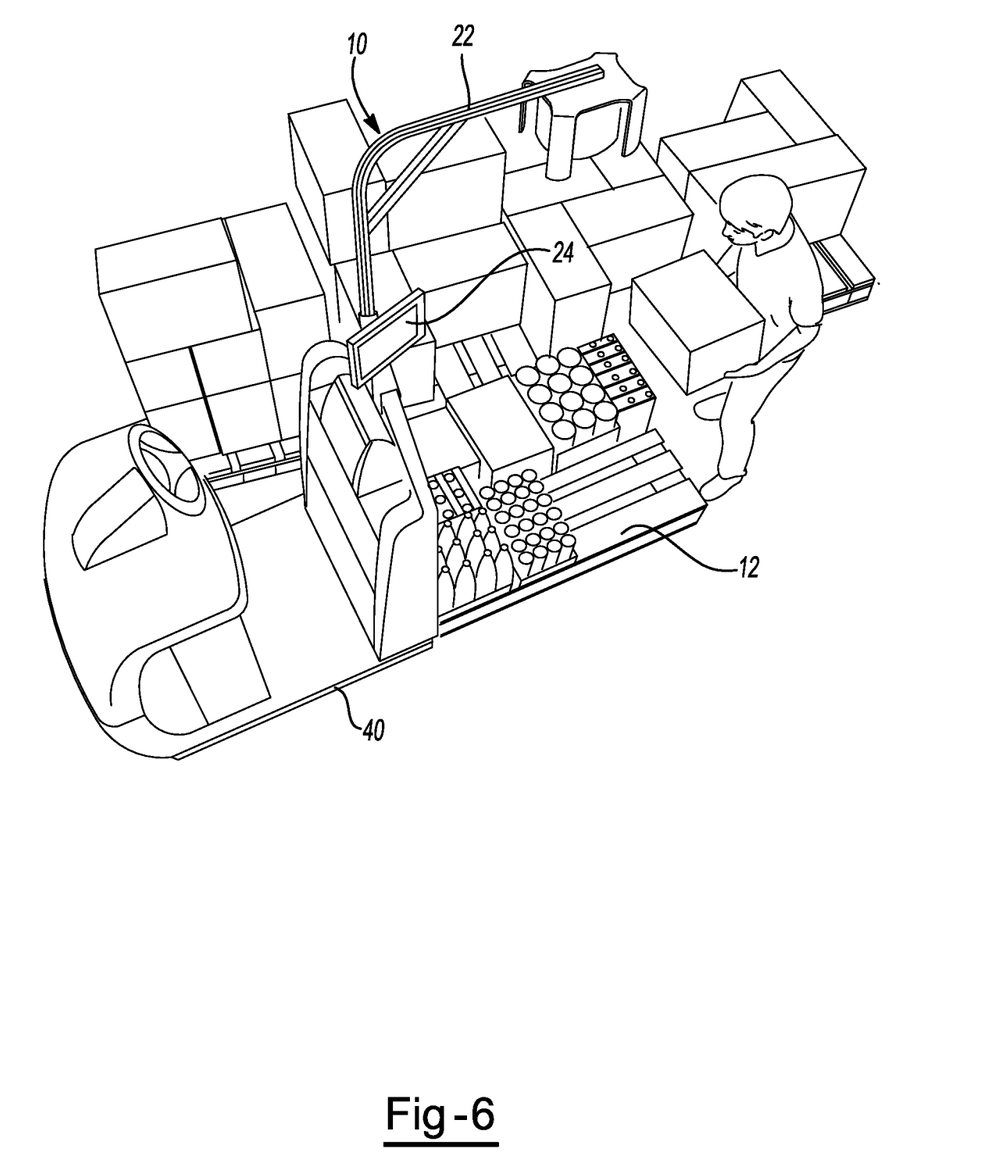
FIG. 6 illustrates a walkie rider having a stack assist system connected thereto.

The stack assist system 10 may be configured to be placed on a mobile unit to allow for transportation around a warehouse. For example, as illustrated in FIG. 6, the stack assist system 10 may be placed on our mounted to a walkie rider 40. The walkie rider 40 may include forks configured to hold the pallet 12. The components of the stack assist system 10 may be mounted or positioned adjacent to the pallet 12 to allow the user to view the stacking instructions while stacking the pallet 12. The walkie rider 40 may be driven to storage locations around the warehouse to retrieve each package to be placed on the optimized pallet stack 20.

In an embodiment, stack assist system 10 may generate an order path for the user/operator of the walkie rider 40. The order path may be computed by the stack assist system 10 software, based on information related to the location of each package within the warehouse, such as from information within the WMS, as well as the packages to be included on the optimized pallet stack 20 and the order sequence of the packages to be stacked onto the pallet 12. The order path may be configured to reduce the order picking time by minimizing the total travel within the warehouse to retrieve the entire pallet stack 20.

The stack assist system 10 on the walkie rider 40 may receive an order path from the software, such as through a wireless communication or through other communication means. The stack assist system 10 may then communicate the order path to the user, such as by providing order path instructions on the display 24.

Figure 8:
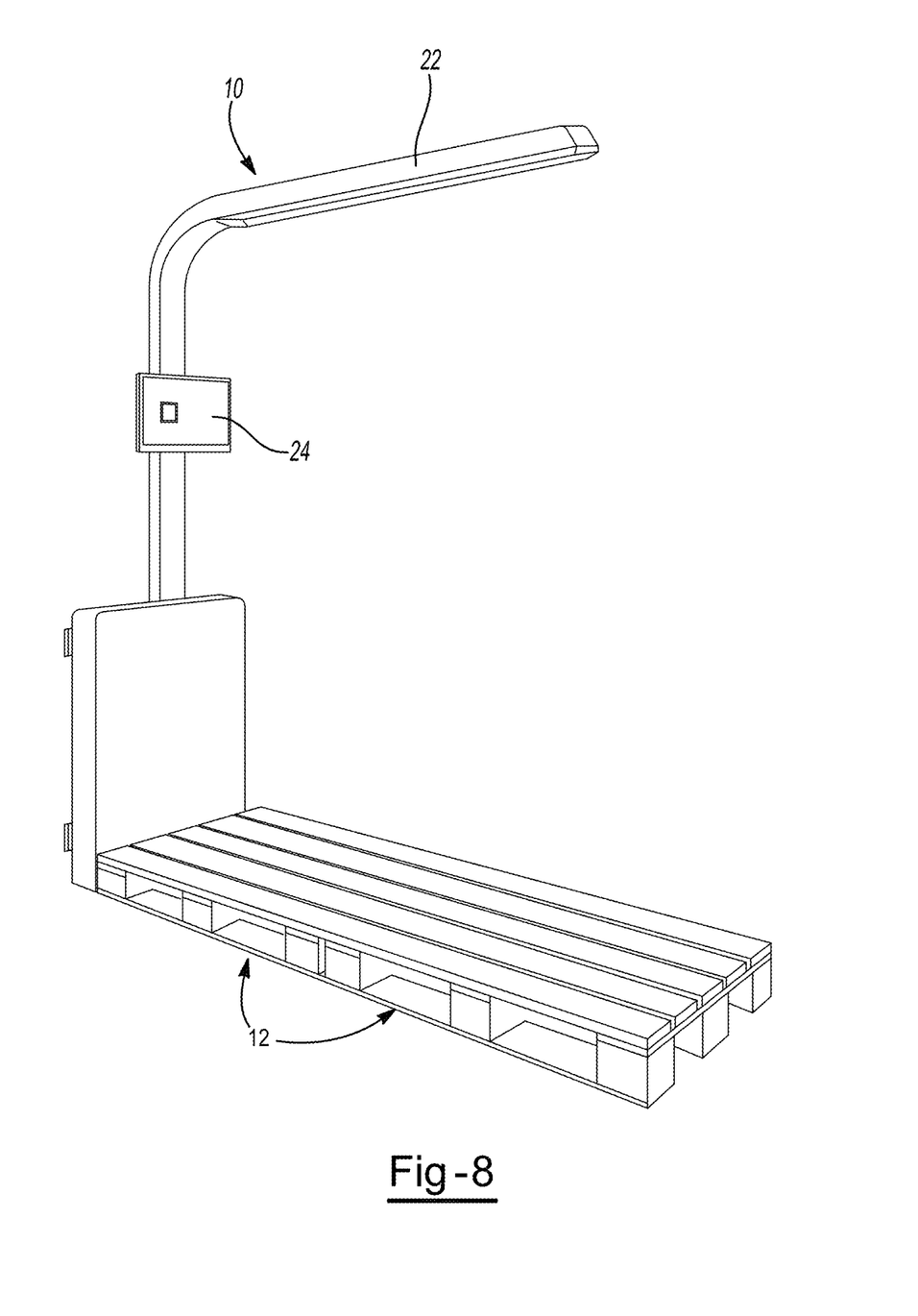
FIG. 8 illustrates a two-pallet stack assist system.

In an embodiment, illustrated in FIG. 8, the walkie rider 40 may be configured to support two or more pallets 12. The stack assist system 10 may determine and provide optimized pallet stacks 20 for each pallet 12. The stack assist system 10 may then determine an order path for picking orders for all pallets 12 on the walkie rider 40.

Figure 7:
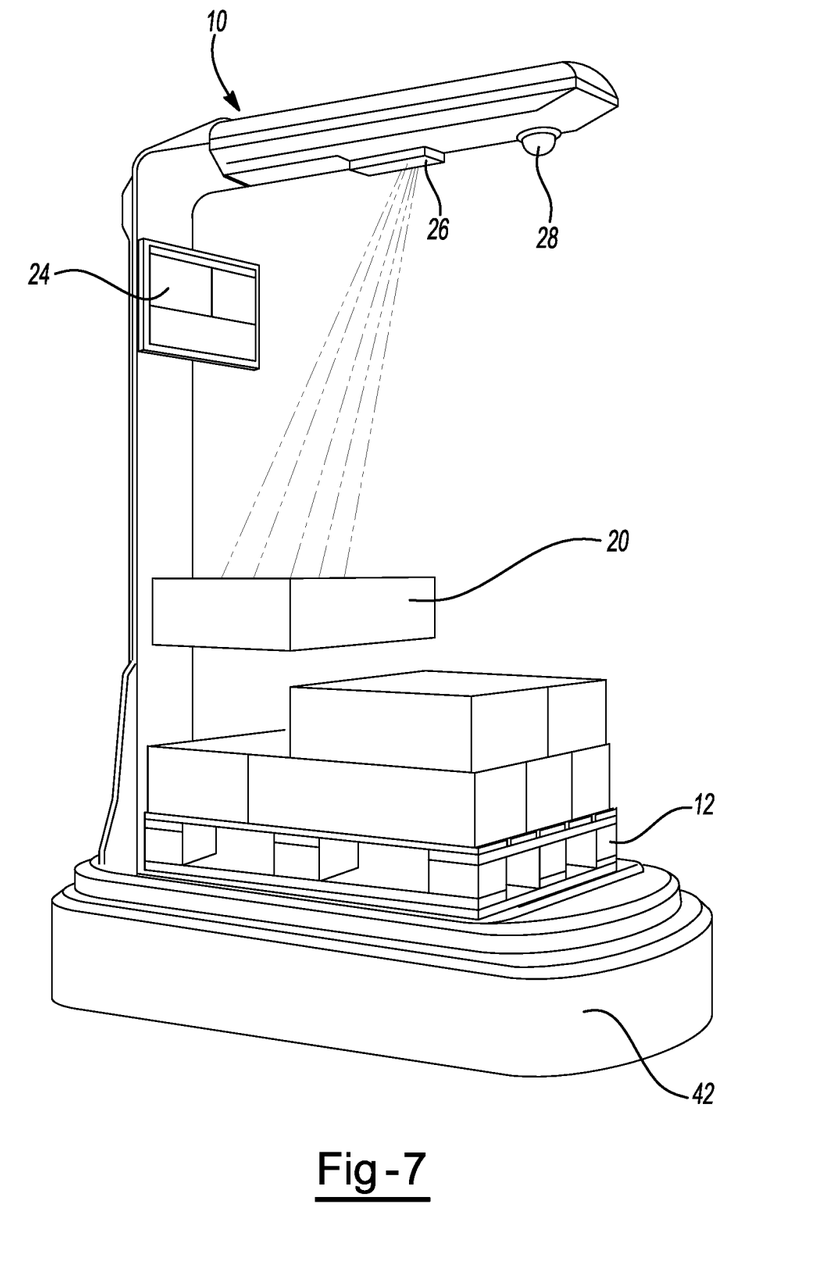
FIG. 7 illustrates an AGV having a stack assist system.

In an embodiment illustrated in FIG. 7, the stack assist system 10 may be mounted to an automated guided vehicle ("AGV") 42. The AGV 42 may be configured to run on a track or guided pat within the warehouse. The AGV 42 may receive an order path from the stack assist system 10 and may navigate to the instructed location within a warehouse. Order pickers may be stationed at various locations within the warehouse and assigned to given areas or zones. An order picker may approach an AGV 42 that is stopped within their assigned zone and review the stacking instructions provided on the display 24. Once the instructed package is loaded onto the pallet stack 20, the AGV 42 may navigate to is next location.

Figure 9:
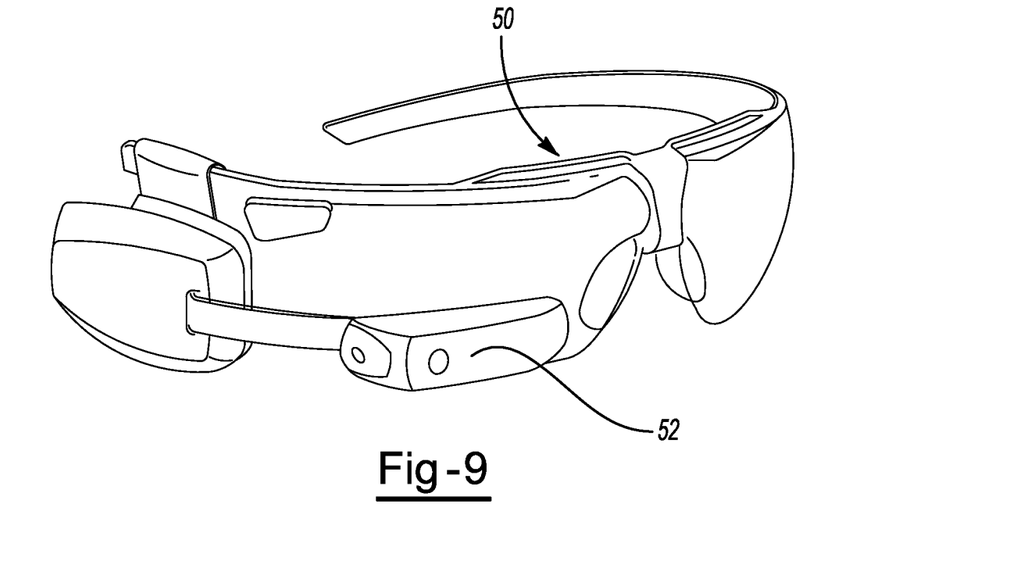
FIG. 9 illustrates smart glasses related to the stack assist system.

In an embodiment, illustrated in FIG. 9, the stack assist system 10 may include smart glasses 50 to assist a user in stacking the optimized pallet stack 20. The smart glasses 50 may include a projector 52 on at least one lens to project images and information for the user to see. The information may include stacking information, such as illustrating the location of a package to be placed onto the stack 20, or other information for creating the pallet stack 20, such as location information. The smart glasses 50 may integrate with and receive information from the stack assist system 10 software. It will be appreciated that the stack assist system 10 may further integrate with or connect to other peripheral or smart components, such as smart watches, mobile devices, and the like. The system 10 may be configured to send instructional output to the devices and receive user input from the devices.

Figure 10:
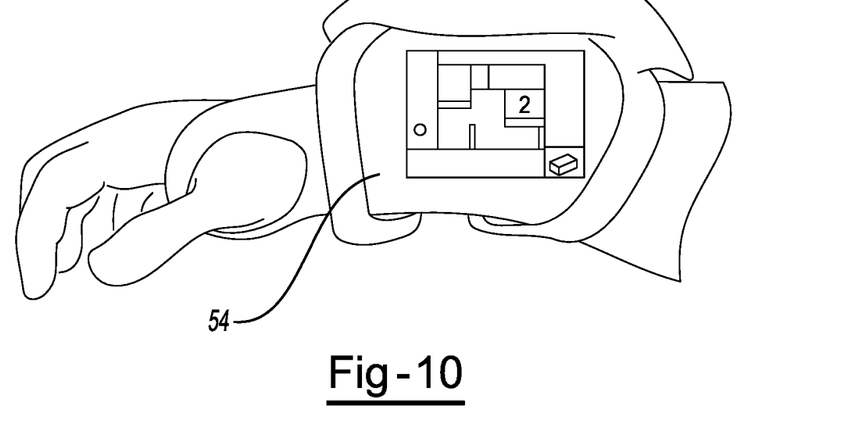
FIG. 10 illustrates a wrist-worn smart device in communication with the stack assist system.

In an embodiment, as illustrated in FIG. 10, the stack assist system 10 may be configured to communicate with a wrist-worn smart device 54. The wrist-worn device 54 may incorporate or include a tablet or smartphone or other smart devices that may connect to the stack assist system 10 via a wireless network, such as Wi-Fi or Bluetooth or the like. The wrist-worn smart device 54 may include a display to provide the user with instructions on locations for package stacking and may receive inputs from the user to the system 10. The wrist-worn smart device 54 may further optionally include a scanner to scan barcodes and the like for verification purposes and to input the scanned information into the system 10.

It will be appreciated that the stack assist system 10 may integrate with cloud based software to allow users to access information remotely without the need to run all software related to the stack assist system 10 on site. The cloud based software may receive input information from the warehouse WMS. The software may perform processing tasks within the cloud, such as generating an optimized pallet stack 20 and creating an order picking path. The software may then download the information to a stack assist system 10 within the warehouse.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof

Having thus described the invention, we claim:

1. A stack assist system comprising:
   a stacking surface configured to receive a plurality of packages thereon;
   a graphical display configured to display a visual representation of an optimized stack of packages to be stacked onto the stacking surface;
   a processor; and
   a support member that extends vertically adjacent to the stacking surface and horizontally above the stacking surface, wherein the graphical display is connected to the support member;
   wherein the processor is configured to receive package data related to packages within a warehouse, wherein the package data includes one or more of package location, package destination, package size, package weight, and package dimensions; and wherein the processor is configured to determine an optimized stack of packages to be stacked onto the stacking surface based on the package data.

2. The stack assist system of claim 1, wherein the stacking surface comprises a pallet.

3. The stack assist system of claim 1 further comprising a camera positioned on the support member, wherein the camera is configured to capture image data of the stacking surface and provide feedback to the stack assist system of the stacked packages.

4. The stack assist system of claim 1 further comprising a package position indicator, wherein the package position indicator is configured to project a visual indication of location to place a package on the stacking surface.

5. The stack assist system of claim 4, wherein the package position indicator comprises a laser.

6. The stack assist system of claim 1, wherein the optimized stack of packages is configured to consider and optimize one or more of: a footprint of the stack; weight distribution within the stack; stability of the stack; order of packages to be stacked or unstacked; open air and density of packages within the stack; total height of the stack; and grouping of packages that are intended for the same destination or that are intended to be positioned near one another at an end user's location.

7. The stack assist system of claim 6, wherein optimization of the optimized stack is adjustable by a user to increase or decrease a weight of a considered parameter in determining the optimized stack.

8. The stack assist system of claim 1, wherein the system is configured to connect to, integrate with, or receive input data from a warehouse management system.

9. A stack assist system comprising:
a mobile unit;
a stacking surface located on the mobile unit, the stacking surface configured to receive a plurality of packages thereon;
a graphical display configured to display a visual representation of an optimized stack of packages to be stacked onto the stacking surface;
a processor; and
a support member that extends vertically adjacent to the stacking surface and horizontally above the stacking surface, wherein the graphical display is connected to the support member;
wherein the processor is configured to receive package data related to packages within a warehouse, wherein the package data includes one or more of package location, package destination, package size, package weight, and package dimensions; and wherein the processor is configured to determine an optimized stack of packages to be stacked onto the stacking surface based on the package data.

10. The stack assist system of claim 9, wherein the mobile unit comprises a walkie-rider vehicle to be steered by a user.

11. The stack assist system of claim 9, wherein the mobile unit comprises an AGV configured to move without direction from a user.

12. The stack assist system of claim 11, wherein the AGV is automated to travel in a path through a warehouse to retrieve packages to be placed onto the stacking surface.

13. The stack assist system of claim 9, wherein the stack assist system is configured to determine a path of travel through a warehouse to retrieve packages in an order to create an optimized stack.

14. The stack assist system of claim 9 further comprising a camera positioned on the support member, wherein the camera is configured to capture image data of the stacking surface and provide feedback to the stack assist system of the stacked packages.

15. The stack assist system of claim 9 further comprising a package position indicator, wherein the package position indicator is configured to project a visual indication of location to place a package on the stacking surface.

16. The stack assist system of claim 15, wherein the package position indicator comprises a laser.

17. The stack assist system of claim 9, wherein the optimized stack of packages is configured to consider and optimize one or more of: a footprint of the stack; weight distribution within the stack; stability of the stack; order of packages to be stacked or unstacked; open air and density of packages within the stack; total height of the stack; and grouping of packages that are intended for the same destination or that are intended to be positioned near one another at an end user's location.

18. The stack assist system of claim 9, wherein the system is configured to connect to, integrate with, or receive input data from a warehouse management system.

* * * * *